United States Patent
Koehler et al.

(10) Patent No.: US 7,026,427 B2
(45) Date of Patent: Apr. 11, 2006

(54) PROCESS FOR THE PREPARATION OF ORGANOPOLYSILOXANE RESIN

(75) Inventors: Thomas Koehler, Kastl (DE); Manfred Meisenberger, Burghausen (DE); Wolfgang Ackermann, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 207 days.

(21) Appl. No.: 10/655,977

(22) Filed: Sep. 5, 2003

(65) Prior Publication Data

US 2004/0092660 A1 May 13, 2004

(30) Foreign Application Priority Data

Sep. 12, 2002 (DE) ............................... 102 42 418

(51) Int. Cl.
*C08G 77/08* (2006.01)

(52) U.S. Cl. ......................... 528/39; 528/21; 528/12; 528/23

(58) Field of Classification Search ............... 528/39, 528/21, 12, 23
See application file for complete search history.

(56) References Cited

U.S. PATENT DOCUMENTS

| 5,548,053 | A | * | 8/1996 | Weidner et al. | ................ 528/14 |
| 5,847,180 | A | | 12/1998 | Gravier et al. | |
| 5,861,457 | A | | 1/1999 | Weidner et al. | |
| 6,197,914 | B1 | * | 3/2001 | Kaeppler et al. | ............. 528/32 |

FOREIGN PATENT DOCUMENTS

| DE | 39 39 846 A1 | 6/1990 |
| DE | 41 32 697 A1 | 4/1993 |
| DE | 42 16 139 A1 | 11/1993 |
| DE | 42 43 895 A1 | 6/1994 |
| DE | 44 19 706 A1 | 12/1995 |
| EP | 0 707 028 A1 | 12/1995 |
| GB | 2 230 018 A | 10/1990 |

OTHER PUBLICATIONS

English Derwent Abstract AN 1996-021357 [3] corresp. to DE 44 19 706 A1.
English Derwent Abstract, 1991, Ref. 91-218498/3 corresp. to JP 03-139526 A.
English Derwent Abstract, 1994, Ref. 94-210121/26 corresp. to EP 604847 A1.
English Derwent Abstract, 1994, Ref. 93-369785/47 corresp. to DE 42 16 139 A1.
English Derwent Abstract AN 1994-210121 [26] corresp. to DE 42 43 895 A1.
English Derwent Abstract AN 1993-110999 [14] corresp. to DE 41 32 697 A1.
Chemical Abstract, 1994, Ref. 121:84344t, corresp. to JP 06-107797 A.
English Derwent Abstract, 1993, Ref. 93-110999/14 corresp. to EP 535687 A1.
English Derwent Abstract, 1994, Ref. 93-369785/47, corresp. to DE 42 16 139 A1.

* cited by examiner

*Primary Examiner*—Margaret G. Moore
(74) *Attorney, Agent, or Firm*—Brooks Kushman P.C.

(57) ABSTRACT

A process for the preparation of organopolysiloxane resins, wherein a silane $$R_3SiOR^1 \quad (I)$$

or a hydrolyzate thereof, and a silane $$Si(OR^2)_4 \quad (II)$$

or a partial hydrolyzate thereof,
are reacted with acidified water and a portion of alcohol distilled off;
the mixture is then reacted in the presence of base and a water-insoluble organic solvent and water, alcohol and optionally a portion of water-insoluble organic solvent are removed;
the mixture is then neutralized with acid, and any water, alcohol, and a portion of organic solvent are distilled off;
the mixture obtained is then treated with organopolysiloxanes and precipitated salts formed are then removed, and optionally,
the mixture is separated from water-insoluble organic solvent.

13 Claims, No Drawings

PROCESS FOR THE PREPARATION OF ORGANOPOLYSILOXANE RESIN

BACKGROUND OF THE INVENTION

1. Field of the Invention

The invention relates to a process for the cost-optimized preparation of organopolysiloxane resins by the hydrolysis and condensation of silanes and/or their partial hydrolyzates, and to their use.

2. Background Art

Processes for the preparation of organopolysiloxane resins are already known. DE-A 41 32 697 describes a process for the preparation of organopolysiloxane resins by the acid hydrolysis of alkoxysilanes or their partial hydrolyzates, followed by a basic aftertreatment and subsequent precipitation in water. DE-A 42 16 139 describes a process for the preparation of organopolysiloxane resins by the hydrolysis of alkyl silicate in the presence of acid, wherein part of the alcohol formed is distilled off prior to basic reaction in a water-insoluble organic solvent, and wherein, after neutralization, the precipitated salt is removed and the reaction mixture is optionally distilled. DE-A 42 43 895 describes a process for the preparation of organopolysiloxane resins by the hydrolysis of alkoxysilanes and/or their partial hydrolyzates in the presence of polybasic acids, wherein, after partial neutralization of the acid, the alcohol formed is partially distilled off before a subsequent basic reaction in a water-insoluble organic solvent, and wherein, after subsequent buffering to a pH of between 6 and 8, water or alcohol is distilled off again and precipitated salt is filtered off.

The foregoing processes have the disadvantage that it is usually very difficult to filter off all of the salt precipitated in the neutralization. A first filtration frequently leaves a slight turbidity, giving the product a bluish opalescence that is unacceptable for quality reasons. This can generally be removed only by several filtrations. Particularly in the preparation of products of higher viscosity (>100 mPa·s), filter performance decreases dramatically with only a slight increase in viscosity and it becomes impossible to remove the opalescence within economic periods of time.

For these reasons, the salt is often filtered off earlier, at the stage of a low-viscosity intermediate. Only then is the higher-viscosity target product prepared by subsequent process steps, e.g. distillation. On the one hand, this procedure demands a greater effort and is thus more cost-intensive, and on the other hand, a turbidity can reoccur during the distillation to give the high-viscosity end product, which makes the preparation process very time-consuming and hence also cost-intensive.

SUMMARY OF THE INVENTION

An object of the invention was to provide a process by which organopolysiloxane resins can be prepared easily with high space-time yields. The process includes nominally four steps optionally followed by a fifth step should a product free of organic solvent be desired.

DETAILED DESCRIPTION OF THE PREFERRED EMBODIMENT(S)

The invention thus relates to a process for the preparation of organopolysiloxane resin, wherein
in a 1st stage,
at least one silane of the formula $$R_3SiOR^1 \quad (I)$$

and/or its hydrolyzate $R_3SiOSiR_3$, where
R are identical or different, and are a monovalent organic radical, and
$R^1$ is an alkyl radical,
and at least one silane of the formula $$Si(OR^2)_4 \quad (II)$$

and/or its partial hydrolyzate, where
$R^2$ are identical or different, and are alkyl radicals,
and optionally an organosilicon compound selected from the group comprising silanes of the formula $$R^3{}_aSi(OR^4)_{4-a} \quad (III)$$

and/or their partial hydrolyzates, where
a is 1 or 2,
$R^3$ are identical or different, and are monovalent organic radicals, and
$R^4$ are identical or different, and are alkyl radicals, and
organopolysiloxanes of the formula $$(R^5{}_2SiO)_b \quad (IV),$$

where
$R^5$ are identical or different, and are monovalent organic radicals, and
b is an integer with a value of 3 to 8, preferably of 4 or 5,
and mixtures thereof,
are reacted with water in the presence of acid, at least part of the alcohol formed being distilled off;
in a 2nd stage,
the homogeneous reaction mixture obtained in the 1st stage is reacted in the presence of base and in the presence of water-insoluble organic solvent in at least a sufficient amount to obtain a homogeneous reaction mixture, and water and alcohol and optionally part of the water-insoluble organic solvent are removed by distillation;
in a 3rd stage,
the reaction mixture obtained in the 2nd stage is neutralized with acid, and any water still present, alcohol and part of the water-insoluble organic solvent are distilled off;
in a 4th stage,
the reaction mixture obtained in the 3rd stage is treated with organopolysiloxanes and optionally other components, and the precipitated salt formed in the neutralization is then removed; and
optionally, in a 5th stage,
the homogeneous reaction mixture obtained in the 4th stage is separated from water-insoluble organic solvent.

Within the framework of the present invention, the term "organopolysiloxanes" shall include polymeric, oligomeric and also dimeric siloxanes.

The radicals R, $R^3$ and $R^5$, in each case independently of one another, are preferably monovalent hydrocarbon radicals having 1 to 18 carbon atoms.

Examples of the radicals R, $R^3$ and $R^5$ include alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; alkenyl radicals such as the vinyl, allyl, n-5-hexenyl, 4-vinylcyclohexyl and 3-norbornenyl radicals; cycloalkyl radicals such as the cyclopentyl, cyclohexyl, 4-ethylcyclohexyl and cycloheptyl radicals, norbornyl radicals and methylcyclohexyl radicals; aryl radicals such as the phenyl, biphenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and β-phenylethyl radicals.

Examples of substituted hydrocarbon radicals R, $R^3$ or $R^5$ include halogenated hydrocarbon radicals such as the chloromethyl, 3-chloropropyl, 3-bromopropyl, 3,3,3-trifluoropropyl and 5,5,5,4,4,3,3-heptafluoropentyl radicals, as well as the chlorophenyl, dichlorophenyl and trifluorotolyl radicals; mercaptoalkyl radicals such as the mercaptomethyl, 2-mercaptoethyl and 3-mercaptopropyl radicals; cyanoalkyl radicals such as the cyanomethyl, 2-cyanoethyl and 3-cyanopropyl radicals; acyloxyalkyl radicals such as the acryloxymethyl, methacryloxymethyl, 3-acryloxypropyl and 3-methacryloxypropyl radicals; aminoalkyl radicals such as the optionally substituted aminomethyl radical and the 3-aminopropyl, N-(2-aminoethyl)-3-aminopropyl and N-(2-aminoethyl)-3-amino-2-methylpropyl radicals; carbamate radicals such as the carbamatomethyl and carbamatopropyl radicals; isocyanate radicals such as the isocyanatomethyl and isocyanatopropyl radicals; aminoaryl radicals such as the aminophenyl radical; hydroxyalkyl radicals such as the hydroxymethyl and hydroxypropyl radicals; and radicals of the formulae

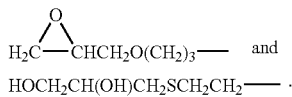 and

HOCH₂CH(OH)CH₂SCH₂CH₂—.

The radicals R, $R^3$ and $R^5$ are most preferably the methyl and vinyl radicals and, in the case of the radical $R^3$, additionally the propyl, isooctyl and phenyl radicals.

Examples of the radicals $R^1$, $R^2$ and $R^4$ are the examples of alkyl radicals given for the radicals R, $R^3$ and $R^5$. The radicals $R^1$, $R^2$ and $R^4$ are preferably alkyl groups having 1 to 4 carbon atoms, most preferably the methyl and ethyl radicals.

The silanes used in the process according to the invention are preferably those of formulae (I), (II) and optionally (III), or their partial hydrolyzates, in which $R^1$, $R^2$ and $R^4$ have meanings given above. If partial hydrolyzates of silanes of general formulae (II) and (III) are used in the process of the invention, those having up to 15 silicon atoms are preferred.

Examples of the silanes of formula (I) or their hydrolyzates, i.e. disiloxanes, include trimethylethoxysilane, vinyldimethylethoxysilane, hexamethyldisiloxane, 1,3-diphenyltetramethyldisiloxane, 1,3-bis(allyl)tetramethyldisiloxane, and 1,3-divinyltetramethylsiloxane. Hexamethyldisiloxane and 1,3-divinyltetramethylsiloxane are particularly preferred.

Examples of the silanes of formula (II) include tetramethoxysilane, tetraethoxysilane and tetra-n-propoxysilane. Tetraethoxysilane and its partial hydrolyzates are particularly preferred.

Examples of the silanes of formula (III) optionally used in the process of the invention include methyltrimethoxysilane, vinyltrimethoxysilane, mercaptomethyltrimethoxysilane, 3-mercaptopropyltrimethoxysilane, chloromethyltrimethoxysilane, 3-chloropropyltrimethoxysilane, phenyltrimethoxysilane, o-, m- and p-tolyltrimethoxysilane, propyltrimethoxysilane, methyltriethoxysilane, vinyltriethoxysilane, mercaptomethyltriethoxysilane, 3-mercaptopropyltriethoxysilane, chloromethyltriethoxysilane, 3-chloropropyltriethoxysilane, cyanomethyltrimethoxysilane, cyanomethyltriethoxysilane, acryloxymethyltrimethoxysilane, acryloxymethyltriethoxysilane, aminomethyltrimethoxysilane, aminomethyltriethoxysilane, 3-aminopropyltriethoxysilane, N-(2-aminoethyl)-3-aminopropyltrimethoxysilane, N-(2-aminoethyl)-3-aminopropyldimethoxymethylsilane, N-(2-aminoethyl)-3-amino-2-methylpropyldimethoxymethylsilane, phenyltriethoxysilane, o-, m- and p-tolyltriethoxysilane, propyltrimethoxysilane, dimethyldiethoxysilane and dimethyldimethoxysilane, it being preferable to use methyltrimethoxysilane, methyltriethoxysilane, vinyltriethoxysilane, phenyltriethoxysilane, o-, m- and p-tolyltriethoxysilane and propyltriethoxysilane.

Examples of the organopolysiloxanes of formula (IV) optionally used in the process of the invention include hexamethylcyclotrisiloxane, octamethylcyclotetrasiloxane and decamethylcyclopentasiloxane, preference being given to octamethylcyclotetrasiloxane and decamethylcyclopentasiloxane.

If a silane of formula (III) or its partial hydrolyzates, and/or an organopolysiloxane of formula (IV) are used, they are preferably used in amounts of up to 15 percent by weight based on the total weight of the silicon compounds.

The organopolysiloxanes used in the 4th stage of the process according to the invention can be any linear, branched or cyclic organopolysiloxanes, preference being given to those consisting of units of the formula $$R^6_c(OH)_dH_eSiO_{(4-c-d-e)/2} \qquad (V),$$

where $R^6$ are identical or different and are monovalent organic radicals, c is 0, 1, 2 or 3, d is 0, 1 or 2, preferably 0, and e is 0, 1 or 2, preferably 0, with the proviso that the sum (c+d+e) is ≦3.

Examples of radicals $R^6$ are the examples given for the radicals R, $R^3$ and $R^5$. $R^6$ are preferably optionally substituted hydrocarbon radicals having 1 to 18 carbon atoms, more preferably unsubstituted hydrocarbon radicals having 1 to 6 carbon atoms, and especially, the methyl, vinyl or phenyl radicals.

Examples of the organopolysiloxanes added in the 4th stage of the process to the reaction mixture obtained in the 3rd stage, are linear or branched siloxanes with hydroxydimethylsiloxy, hydrogendimethylsiloxy, hydroxyphenylmethylsiloxy, hydrogenphenylmethylsiloxy, hydroxydiphenylsiloxy, hydrogendiphenylsiloxy, hydroxyhydrogenmethylsiloxy, dihydrogenmethylsiloxy, hydroxyhydrogenphenylsiloxy, dihydrogenphenylsiloxy, trimethylsiloxy and vinyldimethylsiloxy end groups, which can be made up of dimethylsiloxy, hydrogenmethylsiloxy, diphenylsiloxy, phenylmethylsiloxy and phenylhydrogensiloxy units.

The organopolysiloxanes consisting of units of formula (V) can also be cyclic organopolysiloxanes, e.g. hexamethylcyclotrisiloxane, octamethylcyclotetrasiloxane and decamethylcyclopentasiloxane. The organopolysiloxanes consisting of units of formula (V) are preferably linear or branched organopolysiloxanes, more preferably α,ω-divinyldimethylpolysiloxanes.

The organopolysiloxanes consisting of units of formula (V) used in the process according to the invention preferably have a viscosity of 0.65 to 100,000 mPa·s, more preferably 5 to 50,000 mPa·s, and more preferably 20 to 20,000 mPa·s, in each case at 25° C.

The other components optionally used in the 4th stage of the process may include water-insoluble organic solvents with which e.g. the solids content or the viscosity of the organopolysiloxane resin solution can easily be adjusted, and may also include rheology modifiers and inhibitors.

In the 1st stage of the process, it is preferable to use a mixture of at least one silane of the formula (I) and/or its hydrolyzates, especially a silane in which R is the methyl or vinyl radical, and at least one silane of formula (II) and/or its hydrolyzates, preferably in a molar ratio, based on Si units, of 0.4:1 to 1.8:1, more preferably 0.5:1 to 1.5:1 and most preferably 0.6:1 to 1:1, $R^1$ in formula (I) preferably having the same meaning as $R^2$ in formula (II).

In the 1st stage of the process, water and acid are added to and mixed with a mixture of silane of formula (I) and/or its hydrolyzates, silane of formula (II) and/or its partial hydrolyzates, and optionally organosilicon compound of formula (III) and/or its partial hydrolyzates, or of formula (IV).

In the 1st stage of the process, water is preferably used in amounts of 5 to 30 percent by weight, more preferably 5 to 20 percent by weight, and most preferably of 8 to 18 percent by weight, based in each case on the total weight of the reaction mixture in the 1st stage prior to distillation.

The acids used in the 1st stage of the process according to the invention can be the same acids as those previously used for the hydrolysis of silanes with alkoxy groups. Examples of such acids are inorganic acids such as HCl, $HClO_4$, $H_2SO_4$ and $H_3PO_4$, and organic acids such as acetic acid, formic acid, propionic acid, p-toluenesulfonic acid, methanesulfonic acid, trifluoromethanesulfonic acid and dodecylbenzenesulfonic acid, it being preferable to use HCl, dodecylbenzenesulfonic acid or p-toluenesulfonic acid. It is particularly preferable to use HCl.

In the 1st stage of the process, to achieve a homogeneous reaction mixture, acid is preferably used in amounts of 0.2 to 50 mmol, more preferably 2.5 to 15 mmol, based in each case on 1000 g of the reaction mixture in the 1st stage prior to distillation. Homogeneity of the reaction mixture is generally not achieved at higher acid concentrations. For example, when using the particularly preferred HCl as the acid, a concentration range of 100 to 500 ppm, based on the total weight of the reaction mixture in the 1st stage prior to distillation, has proven advantageous.

If one or more of the radicals R, $R^3$ and $R^5$ are an organic radical containing basic nitrogen, it is necessary to add an extra amount of acid which is sufficient to neutralize these radicals.

All or part of the alcohol formed in the hydrolysis of the 1st stage of the process is removed during or after the hydrolysis, especially afterward. Depending on the type of alcohol or the amount of water used, the distillate may contain certain amounts of water. Preferably, the alcohol is distilled off after the hydrolysis to such an extent that the reaction mixture remains homogeneous. Most preferably, 50 to 90 percent by weight of the alcohol, based on the total weight of alcohol formed, is removed by distillation.

The 1st stage of the process is preferably carried out at a temperature of 20° C. to the boiling point of the reaction mixture, more preferably at the boiling point of the reaction mixture, and preferably at a pressure of between 900 and 1100 hPa. The 1st stage of the process preferably takes place over a time period of 30 minutes to 5 hours, more preferably 1 to 3 hours.

When the 1st stage of the process has ended, base is added in at least the amount necessary to obtain a basic reaction mixture, and optionally other substances and water-insoluble organic solvent are added. Depending on the base used, the amounts of base generally range from 0.02 to 2.0 percent by weight, based on the total weight of the reaction mixture in the 2nd stage prior to distillation. The amount of base added in the 2nd stage is preferably such that the pH ranges from 8.0 to 14.0, more preferably from 9.0 to 12.0.

The bases used in the 2nd stage of the process according to the invention can be any bases that have hitherto been used as catalysts in condensation reactions. Examples of such bases include alkali metal hydroxides such as sodium hydroxide and potassium hydroxide, alkali metal siliconates such as sodium siliconate and potassium siliconate, amines, for example methylamine, dimethylamine, ethylamine, diethylamine, triethylamine and n-butylamine, and ammonium compounds, for instance tetramethylammonium hydroxide, tetra-n-butylammonium hydroxide and benzyltrimethylammonium hydroxide, preference being given to sodium hydroxide, potassium hydroxide, methylamine, ethylamine, diethylamine and benzyltrimethylammonium hydroxide. Particular preference is given to sodium hydroxide, potassium hydroxide and methylamine.

The term 'water-insoluble organic solvents' shall be understood hereafter as meaning solvents miscible with water in amounts of up to at most 1 g/l at room temperature and atmospheric pressure. Examples of water-insoluble organic solvents are hydrocarbons such as pentane, n-hexane, cyclohexane, octene, decene, dodecene, tetradecene, hexadecene, octadecene, benzene, toluene and o-, m- and p-xylenes, or mixtures of higher-boiling hydrocarbon fractions, e.g. mixtures of $C_8$- to $C_{10}$-alkanes with a boiling range of 116 to 136° C., $C_9$- to $C_{13}$-alkanes with a boiling range of 155 to 173° C., $C_{10}$- to $C_{14}$-alkanes with a boiling range of 173 to 190° C., $C_{11}$- to $C_{15}$-alkanes with a boiling range of 189 to 207° C., and $C_{11}$- to $C_{16}$-alkanes with a boiling range of 204 to 247° C., particular preference being given to 1-dodecene, hydrocarbon mixtures of $C_8$- to $C_{10}$-alkanes with a boiling range of 116 to 136° C., toluene and o-, m- and p-xylenes.

The water-insoluble organic solvent used in the 2nd stage of the process is used in at least the amount sufficient to obtain a homogeneous reaction mixture. The amounts of water-insoluble organic solvents are preferably up to 50 percent by weight, more preferably up to 40 percent by weight, based on the total weight of the reaction mixture in the 2nd stage prior to distillation. In particular, the number of parts by volume of water-insoluble organic solvent added is the same as the number of parts by volume of alcohol and optionally water distilled off in the 1st stage.

In the distillation carried out in the 2nd stage of the process, the water contained in the reaction mixture, and the residual alcohol, are completely or almost completely distilled off, water-insoluble organic solvent optionally being distilled off at the same time. The distillation is advantageously begun immediately after the addition of base. The distillation is necessary when an organopolysiloxane resin free of alkoxy and/or hydroxyl groups, or an organopolysiloxane resin with a low content of alkoxy and/or hydroxyl groups is to be obtained.

When the base is added in the 2nd stage to the acidic reaction mixture from the 1st stage, a salt is formed which may precipitate after the distillation in the 2nd stage. The 2nd stage of the process according to the invention is preferably carried out at the boiling point of the reaction mixture and at a pressure of between 900 and 1100 hPa, and preferably lasts 0.5 to 5 hours, more preferably 1 to 3 hours.

When the 2nd stage of the process has ended, the reaction mixture is neutralized with acid in a 3rd stage, and any water still present, alcohol and part of the water-insoluble organic solvent are distilled off. Suitable acids for the neutralization are any of those mentioned in the 1st stage, it being preferable to use the same acid as in the 1st stage.

If acids diluted with water are used for the neutralization in the 3rd stage of the process, and/or if the distillation in the 2nd stage was not complete, water must be distilled off in the 3rd stage, the salt present in the reaction mixture generally precipitating out completely after the distillation. Depending on the type of water-insoluble organic solvent, especially in the case of toluene, 1-dodecene and xylene, the water is distilled off as a mixture with this organic solvent.

If anhydrous acids are used for the neutralization in the 3rd stage of the process, and the distillation in the 2nd stage was complete in respect of water, the distillation in the 3rd stage can be omitted, the salt formed in the neutralization generally precipitating out immediately.

When the 3rd stage of the process has ended, organopolysiloxanes and optionally other components are added to the reaction mixture in a 4th stage, after which the precipitated salt formed in the neutralization is separated from the reaction mixture, preferably by filtration.

In the 4th stage of the process, organopolysiloxanes are preferably used in amounts of 0.1 to 1000 parts by weight, more preferably 0.1 to 100 parts by weight, and most preferably 0.1 to 60 parts by weight, based in each case on 100 parts by weight of the total amount of organosilicon compounds of formulae (I) to (IV) used in the 1st stage.

If other components are used in the 4th stage of the process, they are preferably the same water-insoluble organic solvents as those already used in the 2nd stage, rheology modifiers, and/or inhibitors such as 1-ethynyl-1-cyclohexanol, 2-methyl-3-butyn-2-ol, 3-methyl-1-pentyn-3-ol, 2,5-dimethyl-3-hexyne-2,5-diol, 3,5-dimethyl-1-hexyn-3-ol, 3,7-dimethyloct-1-yn-6-en-3-ol, a mixture of diallyl maleate and vinyl acetate, and maleic acid monoesters such as monooctyl maleate. The other components are most preferably water-insoluble organic solvents and/or inhibitors.

If water-insoluble organic solvents are used as other components in the 4th stage of the process in order to adjust the solids content or the viscosity of the organopolysiloxane resin solution, they are preferably used in amounts of 0.1 to 1000 parts by weight, more preferably 0.1 to 100 parts by weight, and most preferably of 1 to 50 parts by weight, based in each case on 100 parts by weight of the total amount of organosilicon compounds of formulae (I) to (IV) used in the 1st stage.

If rheology modifiers are used as other components in the 4th stage of the process, the amounts are preferably from 0.01 to 100 parts by weight, more preferably from 0.05 to 50 parts by weight, and most preferably from 0.1 to 10 parts by weight, based in each case on 100 parts by weight of the total amount of organosilicon compounds of formulae (I) to (IV) used in the 1st stage.

If inhibitors are used as other components in the 4th stage of the process, the amounts are preferably from 0.01 to 100 parts by weight, more preferably from 0.05 to 50 parts by weight, and most preferably from 0.1 to 10 parts by weight, based in each case on 100 parts by weight of the total amount of organosilicon compounds of formulae (I) to (IV) used in the 1st stage.

When the 4th stage of the process has ended, the organopolysiloxane resin containing water-insoluble organic solvent is optionally separated from the water-insoluble organic solvent in a 5th stage. This is preferably carried out by distillation or spray drying.

If the 5th stage of the process is a distillation, the distillation is preferably carried out under an inert gas, for instance nitrogen. The temperature of the stirred material is preferably between 20 and 250° C., depending on the water-insoluble organic solvent used. It is possible for the water-insoluble organic solvent to be recovered.

If the 5th stage of the process is a spray drying, spray drying is preferably carried out under an inert gas, for instance nitrogen. The inlet temperature is preferably between 60 and 350° C., depending on the water-insoluble organic solvent used, and the outlet temperature is preferably between 50 and 200° C. It is possible for the water-insoluble organic solvent to be recovered.

In one preferred embodiment of the process according to the invention, in a 1st stage, hexamethyldisiloxane and/or trimethylethoxysilane optionally mixed with 1,3-divinyltetramethyldisiloxane and/or vinyldimethylethoxysilane and tetraethoxysilane, and/or their partial hydrolyzates, are mixed with water and 0.2 to 50 mmol of acid, based on 1000 g of reaction mixture in the 1st stage prior to distillation, reacted at the boiling point of the reaction mixture and at a pressure of between 900 and 1100 hPa, and ethanol formed is distilled off; in a 2nd stage, the homogeneous reaction mixture obtained in the 1st stage is reacted in the presence of a base selected from among sodium hydroxide, potassium hydroxide and methylamine, and in the presence of a water-insoluble organic solvent, especially toluene, 1-dodecene, or xylene, at the boiling point of the reaction mixture and at a pressure of between 900 and 1100 hPa, all or almost all of the water and ethanol and optionally part of the water-insoluble organic solvent being distilled off; in a 3rd stage, the reaction mixture obtained in the 2nd stage is neutralized with acid and optionally all or almost all of the water and ethanol and optionally part of the water-insoluble organic solvent are distilled off; in a 4th stage, the reaction mixture obtained in the 3rd stage is treated with organopolysiloxanes and optionally other components, after which the precipitated salt formed in the neutralization is filtered off; and optionally, in a 5th stage, the reaction mixture obtained in the 4th stage is distilled or spray-dried in a nitrogen atmosphere.

In one particularly preferred embodiment of the process according to the invention, in a 1st stage, hexamethyldisiloxane and/or trimethylethoxysilane optionally mixed with 1,3-divinyltetramethyldisiloxane and/or vinyldimethylethoxysilane and tetraethoxysilane, and/or their partial hydrolyzates, are mixed with water and 100 to 500 ppm of HCl, based on the total weight of the reaction mixture in the 1st stage prior to distillation, and reacted at the boiling point of the reaction mixture and at a pressure of between 900 and 1100 hPa, and approx. 70 percent by weight of the ethanol formed, based on the total amount of ethanol formed, is distilled off; in a 2nd stage, the homogeneous reaction mixture obtained in the 1st stage is reacted in the presence of a base selected from the group consisting of sodium hydroxide, potassium hydroxide and methylamine, and in the presence of toluene, 1-dodecene or xylene as the water-insoluble organic solvent, at the boiling point of the reaction mixture and at a pressure of between 900 and 1100 hPa, all or almost all of the water and ethanol and optionally part of the water-insoluble organic solvent being distilled off; in a 3rd stage, the reaction mixture obtained in the 2nd stage is neutralized with HCl, all or almost all of the water and optionally ethanol and optionally part of the water-insoluble organic solvent being distilled off; in a 4th stage, the reaction mixture obtained in the 3rd stage is treated with organopolysiloxanes containing vinyl groups and having a viscosity of 5 to 50,000 mPa·s, after which the precipitated salt formed in the neutralization is filtered off; and optionally, in a 5th stage, the reaction mixture obtained in the 4th stage is distilled or spray-dried in a nitrogen atmosphere.

If the 5th stage of the process according to the invention is not carried out, the organopolysiloxane resin is normally obtained as a mixture with water-insoluble organic solvent in the form of so-called resin concentrate.

The organopolysiloxane resin according to the invention preferably has an average molecular weight of 500 to 100,000 g/mol and on average contains no alkoxy groups or at most up to 8 mol percent of alkoxy groups, based on tetrafunctional Si units ($SiO_{4/2}$), and no hydroxyl groups or at most 0.8 percent by weight of hydroxyl groups, based on the total weight of organopolysiloxane resin. The organopolysiloxane resin according to the invention is at least partially soluble, but preferably totally soluble, in liquid organopolysiloxane.

Examples of the organopolysiloxane resins according to the invention are $[Me_3SiO_{1/2}]_x[SiO_{4/2}]_y$, where Me is the methyl radical and the ratio x:y is 0.6:1 to 1:1, and $[Me_3SiO_{1/2}]_x[Me_2ViSiO_{4/2}]_y[SiO_{4/2}]_z$, where Me is the methyl radical, Vi is the vinyl radical, the ratio (x+y):z is 0.6:1 to 1:1 and the ratio x:y is 98:2 to 60:40.

The process according to the invention has the advantage that it is very easy to carry out, has a very good reproducibility and provides high space-time yields. Thus, particularly after the addition of organopolysiloxanes, higher-viscosity reaction mixtures can be separated from the precipitated salt formed in the neutralization, preferably by a single filtration, without observing an opalescence that is difficult to filter off, and which can only be removed by expensive measures and with a significant loss of yield.

The water-insoluble organic solvent and the alcohol, can easily be recovered. Another advantage is that, in the subject invention process, no liquid/liquid phase separation is carried out and hence no yield loss occurs. Because of the homogeneous reaction procedure and the low acid concentrations, the resin formed has only a small proportion of low-molecular resin fractions.

The organopolysiloxane resins obtained by the inventive process have a high purity and no alkoxy and/or hydroxyl groups or a low content of alkoxy and/or hydroxyl groups; they possess a high storage stability and are outstandingly capable of further processing to products with a high storage stability. The resins according to the invention are therefore outstandingly capable of producing powders by spray drying.

The process according to the invention with spray drying carried out in the 5th step for the production of organopolysiloxane powder has the advantage that the resin is not altered by spray drying and the powder is obtained with high solution kinetics. The organopolysiloxane resin powders also have the advantage that they are obtained substantially free of organic solvent and have a good storage stability.

The organopolysiloxane resin powders preferably have a mean particle size of 1 to 500 μm. The organopolysiloxane resin powders are at least partially soluble, but preferably totally soluble, in organopolysiloxanes and common organic solvents. For example, the organopolysiloxane resin powders have an excellent solubility in organic solvents such as toluene, acetone, hexane and tetrahydrofuran, whereas they are only partially soluble in lower alcohols such as methanol and ethanol.

The organopolysiloxane resins are suitable for all the applications in which organopolysiloxane resins are used. Thus the inventive organopolysiloxane resins or resin concentrates and organopolysiloxane resin powders can be used, for example, as foam stabilizers and as additives for antifoams and cosmetic formulations (e.g. as fixatives in hair strengtheners), toners, lacquer systems and in other coating systems, for instance in paper coating compositions. However, they can also be used in place of hydrophobicized, highly disperse silicic acid as fillers in plastics, especially silicone rubber.

Unless indicated otherwise, all the parts and percentages in the following examples are by weight. Unless indicated otherwise, the following examples are carried out at atmospheric pressure, i.e. at about 1000 hPa, and at room temperature, i.e. at about 20° C., or at a temperature that results when the reactants are brought together at room temperature without additional heating or cooling. All the viscosity data mentioned in the examples relate to a temperature of 25° C.

EXAMPLE 1

210 g of water and 1.9 g of 20% aqueous hydrochloric acid are added to 900 g of tetraethoxysilane with an $SiO_2$ content of 40%, commercially available under the name TES 40 from Wacker-Chemie GmbH, Munich, 350 g of hexamethyldisiloxane and 55.4 g of 1,3-divinyltetramethyldisiloxane, and the mixture is refluxed for a period of 2.5 hours at a temperature of 78° C. 483 g of distillate are then withdrawn over one hour. The distillate obtained contains 11% of water and 89% of ethanol.

481 g of 1-dodecene and 4 g of 25% aqueous NaOH solution are then added to the homogeneous reaction mixture and 239 g of volatile constituents are distilled off.

The homogeneous reaction mixture is then neutralized with 2.1 ml of 20% aqueous hydrochloric acid, and 273 g of volatile constituents are distilled off.

125 g of a dimethylpolysiloxane with vinyl end groups and a viscosity of 20,000 mPa·s at 25° C., 20 g of 1-dodecene for adjusting the solids content, and 3 g of ethynylcyclohexanol are then added.

After the addition of 4 g of a filter aid, the resin mixture obtained is filtered once to produce a clear solution immediately, yielding 1131 g (98% of theory) of a neutral organopolysiloxane resin solution in 1-dodecene with a solids content of 77.9% and a viscosity of 555 mm$^2$/s. According to NMR measurements, the resin has a residual ethoxy content of 6.4 mol % and an OH content of 0.22%, based on tetrafunctional Si units ($SiO_{4/2}$).

EXAMPLE 2

A mixture of 210 g of water and 1.6 g of conc. sulfuric acid is added to 900 g of tetraethoxysilane with an $SiO_2$ content of 40%, 350 g of hexamethyldisiloxane and 55.4 g of 1,3-divinyltetramethyldisiloxane and the resulting mixture is refluxed for a period of 2.5 hours at a temperature of 78° C. 477 g of distillate are then withdrawn over one hour. The distillate obtained contains 11% of water and 89% of ethanol.

481 g of 1-dodecene and 4 g of 25% aqueous NaOH solution are then added to the homogeneous reaction mixture and 264 g of volatile constituents are distilled off.

The homogeneous reaction mixture is then neutralized with 0.5 ml of conc. aqueous sulfuric acid, and 271 g of volatile constituents are distilled off. 125 g of a dimethylpolysiloxane with vinyl end groups and a viscosity of 20,000 mPa·s at 25° C., 20 g of 1-dodecene for adjusting the solids content, and 3 g of ethynylcyclohexanol are then added.

After the addition of 4 g of a filter aid, the resin mixture obtained is filtered once to produce a clear solution immediately, yielding 1112 g (98% of theory) of a neutral organopolysiloxane resin solution in 1-dodecene with a solids content of 78.1% and a viscosity of 690 mm2/s. According to NMR measurements, the resin has a residual ethoxy content of 5.9 mol % and an OH content of 0.16%, based on tetrafunctional Si units ($SiO_{4/2}$).

COMPARATIVE EXAMPLE 1

210 g of water and 1.9 g of 20% aqueous hydrochloric acid are added to 900 g of tetraethoxysilane with an $SiO_2$ content of 40%, 350 g of hexamethyldisiloxane and 55.4 g of 1,3-divinyltetramethyldisiloxane and the mixture is refluxed for a period of 2.5 hours at a temperature of 78° C. 484 g of distillate are then withdrawn over one hour. The distillate obtained contains 11% of water and 89% of ethanol.

481 g of 1-dodecene and 4 g of 25% aqueous NaOH solution are then added to the homogeneous reaction mixture and 281 g of volatile constituents are distilled off.

The homogeneous reaction mixture is then neutralized with 2.1 ml of 20% aqueous hydrochloric acid, and 6 g of volatile constituents are distilled off.

After the addition of 4 g of a filter aid, the resin mixture obtained is filtered to produce an opalescent solution. A repeat filtration gives a clear product with a solids content of 59.8%.

265 g of volatile constituents are then distilled off and, after cooling, 125 g of a dimethylpolysiloxane with vinyl end groups and a viscosity of 20,000 mPa·s at 25° C., and 20 g of 1-dodecene for adjusting the solids content, are added, yielding 1131 g (98% of theory) of a neutral clear organopolysiloxane resin solution in 1-dodecene with a solids content of 78.7% and a viscosity of 623 mm²/s. According to NMR measurements, the resin has a residual ethoxy content of 6.3 mol % and an OH content of 0.11%, based on tetrafunctional Si units ($SiO_{4/2}$).

COMPARATIVE EXAMPLE 2

210 g of water and 1.9 g of 20% aqueous hydrochloric acid are added to 900 g of tetraethoxysilane with an $SiO_2$ content of 40%, 350 g of hexamethyldisiloxane and 55.4 g of 1,3-divinyltetramethyldisiloxane and the mixture is refluxed for a period of 2.5 hours at a temperature of 78° C. 484 g of distillate are then withdrawn over one hour. The distillate obtained contains 11% of water and 89% of ethanol.

481 g of 1-dodecene and 4 g of 25% aqueous NaOH solution are then added to the homogeneous reaction mixture and 280 g of volatile constituents are distilled off.

The homogeneous reaction mixture is then neutralized with 2.1 ml of 20% aqueous hydrochloric acid, and 270 g of volatile constituents are distilled off.

4 g of a filter aid were added to the resin mixture obtained and the resulting mixture was then filtered. However, it was found that, under the conventional filtration conditions and with the conventional filtration times as in Examples 1 and 2, only small amounts of an opalescent filtrate could be obtained, so the attempted filtration was stopped.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The words "a" and "an" mean "one or more than one" unless indicated to the contrary.

What is claimed is:

1. A process for the preparation of an organopolysiloxane resin, comprising, in the order stated:
   reacting in a 1st stage,
   at least one silane of the formula $$R_3SiOR^1 \qquad (I)$$

and/or its hydrolyzate $R_3SiOSiR_3$, where
   R are identical or different, and are a monovalent organic radicals, and
   $R^1$ is an alkyl radical,
   and at least one silane of the formula $$Si(OR^2)_4 \qquad (II)$$

and/or its partial hydrolyzates, where
   $R^2$ are identical or different and are alkyl radicals,
   and optionally an organosilicon compound selected from the group consisting of silanes of the formula $$R^3{}_aSi(OR^4)_{4-a} \qquad (III)$$

and/or their partial hydrolyzates, where
   a is 1 or 2,
   $R^3$ are identical or different and are monovalent organic radicals, and
   $R^4$ are identical or different and are alkyl radicals, and
   organopolysiloxanes of the formula $$(R^5{}_2SiO)_b \qquad (IV),$$

where
   $R^5$ are identical or different and are monovalent organic radicals, and
   b is an integer with a value of 3 to 8,
   and mixtures thereof, with water in the presence of acid, at least part of the alcohol formed being distilled off;
   in a 2nd stage,
   reacting a homogeneous reaction mixture obtained in the 1st stage in the presence of base and in the presence of a water-insoluble organic solvent in at least a sufficient amount to obtain a homogeneous reaction mixture, and removing water and alcohol and optionally part of the water-insoluble organic solvent by distillation;
   in a 3rd stage,
   neutralizing the reaction mixture obtained in the 2nd stage with acid, and distilling away any water still present, alcohol and part of the water-insoluble organic solvent;
   in a 4th stage,
   treating the reaction mixture obtained in the 3rd stage with at least one organopolysiloxane and removing precipitated salt formed in the neutralization;
   optionally, in a 5th stage,
   separating the homogeneous reaction mixture obtained in the 4th stage from water-insoluble organic solvent.

2. The process of claim 1, wherein b is an integer of 4 or 5.

3. The process of claim 1, wherein the organopolysiloxanes used in the 4th stage contain units of the formula

$$R^6{}_c(OH)_dH_eSiO_{(4-c-d-e)/2} \quad (V),$$

where
R$^6$ are identical or different, and are monovalent organic radicals,
c is 0, 1, 2 or 3,
d is 0, 1 or 2, and
e is 0, 1 or 2,
with the proviso that the sum ©+d+e) is ≦3.

4. The process of claim 3, wherein d is 0.

5. The process of claim 3, wherein e is 0.

6. The process of claim 3, wherein the organopolysiloxanes containing units of formula (V) are linear or branched organopolysiloxanes.

7. The process of claim 3, wherein the organopolysiloxanes containing units of formula (V), have a viscosity of 0.65 to 100,000 mPa·s at 25° C.

8. The process of claim 1,
wherein in a 1st stage,
hexamethyldisiloxane and/or trimethylethoxysilane optionally mixed with 1,3-divinyltetramethyldisiloxane and/or vinyldimethylethoxysilane and tetraethoxysilane, and/or their partial hydrolyzates, are mixed with water and 0.2 to 50 mmol of acid, based on 1000 g of reaction mixture in the 1st stage prior to distillation, and reacted at the boiling point of the reaction mixture and at a pressure of between 900 and 1100 hPa, and ethanol formed is distilled off;
in a 2nd stage,
a homogeneous reaction mixture obtained in the 1st stage is reacted in the presence of at least one base selected from the group consisting of sodium hydroxide, potassium hydroxide and methylamine, and in the presence of a water-insoluble organic solvent, at the boiling point of the reaction mixture and at a pressure of between 900 and 1100 hPa, all or almost all of the water and ethanol and optionally part of the water-insoluble organic solvent is distilled off;
in a 3rd stage,
the reaction mixture obtained in the 2nd stage is neutralized with acid and optionally all or almost all of the water and ethanol and optionally part of the water-insoluble organic solvent are distilled off;
in a 4th stage,
the reaction mixture obtained in the 3rd stage is treated with organopolysiloxanes, after which the precipitated salt formed in the neutralization is filtered off; and
optionally, in a 5th stage,
the reaction mixture obtained in the 4th stage is distilled or spray-dried in a nitrogen atmosphere.

9. The process of claim 8, wherein the water-insoluble organic solvent is selected from the group consisting of toluene, 1-dodecene, xylene, or mixtures thereof.

10. The process of claim 1,
wherein in a 1st stage,
hexamethyldisiloxane and/or trimethylethoxysilane optionally mixed with 1,3-divinyltetramethyldisiloxane and/or vinyldimethylethoxysilane and tetraethoxysilane, and/or their partial hydrolyzates, are mixed with water and 100 to 500 ppm of HCl, based on the total weight of the reaction mixture in the 1st stage prior to distillation, and reacted at the boiling point of the reaction mixture and at a pressure of between 900 and 1100 hPa, and about 70 percent by weight of the ethanol formed, based on the total amount of ethanol formed, is distilled off;
in a 2nd stage,
a homogeneous reaction mixture obtained in the 1st stage is reacted in the presence of at least one base selected from the group comprising sodium hydroxide, potassium hydroxide and methylamine, and in the presence of toluene, 1-dodecene or xylene as the water-insoluble organic solvent, at the boiling point of the reaction mixture and at a pressure of between 900 and 1100 hPa, all or almost all of the water and ethanol and optionally part of the water-insoluble organic solvent being distilled off;
in a 3rd stage,
the reaction mixture obtained in the 2nd stage is neutralized with HCl, all or almost all of the water and optionally ethanol and optionally part of the water-insoluble organic solvent is distilled off;
in a 4th stage,
the reaction mixture obtained in the 3rd stage is treated with organopolysiloxanes containing vinyl groups and having a viscosity of 5 to 50,000 mPa·s, after which the precipitated salt formed by neutralization is filtered off; and
optionally, in a 5th stage,
the reaction mixture obtained in the 4th stage is distilled or spray-dried in a nitrogen atmosphere.

11. The process of claim 1, wherein in the fourth stage, further water-insoluble organic solvent, a rheology modifier, an inhibitor, or two or more of these are added.

12. The process of claim 8, wherein in the fourth stage, further water-insoluble organic solvent, a rheology modifier, an inhibitor, or two or more of these are added.

13. The process of claim 10, wherein in the fourth stage, further water-insoluble organic solvent, a rheology modifier, an inhibitor, or two or more of these are added.

* * * * *